(12) United States Patent
Evers et al.

(10) Patent No.: US 12,181,325 B2
(45) Date of Patent: Dec. 31, 2024

(54) DEVICE FOR CAPACITIVELY MEASURING THE POWDER FILL LEVEL IN A FILLING APPARATUS OF A ROTARY PRESS

(71) Applicant: Fette Compacting GmbH, Schwarzenbek (DE)

(72) Inventors: Alexander Evers, Hamburg (DE); Nicolas Walter, Hamburg (DE); Sven Kolbe, Büchen (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 139 days.

(21) Appl. No.: 17/089,824

(22) Filed: Nov. 5, 2020

(65) Prior Publication Data
US 2021/0131853 A1    May 6, 2021

(30) Foreign Application Priority Data
Nov. 5, 2019    (DE) ..................... 10 2019 129 793.1

(51) Int. Cl.
*G01F 23/263*    (2022.01)
*B30B 11/00*    (2006.01)
(Continued)

(52) U.S. Cl.
CPC .......... *G01F 23/268* (2013.01); *B30B 11/005* (2013.01); *B30B 11/08* (2013.01); *B30B 15/302* (2013.01)

(58) Field of Classification Search
CPC ..... B30B 15/302; B30B 15/32; G01F 23/265; G01F 23/268; G01F 23/263; G01B 7/082; G01B 7/08; G01N 27/221; G01N 27/226
See application file for complete search history.

(56) References Cited

U.S. PATENT DOCUMENTS

| 4,133,454 A | 1/1979 | Arthur et al. |
| 5,459,406 A * | 10/1995 | Louge .................. G01N 27/226 |
| | | 324/688 |

(Continued)

FOREIGN PATENT DOCUMENTS

| CN | 207456560 U | 6/2018 |
| DE | 2645164 A1 | 10/1976 |

(Continued)

OTHER PUBLICATIONS

English translation of DE-102017207162-A1 by EPO (OA Appendix). (Year: 2018).*

(Continued)

*Primary Examiner* — Timothy Kennedy
*Assistant Examiner* — Inja Song
(74) *Attorney, Agent, or Firm* — Barclay Damon LLP

(57) ABSTRACT

A device for capacitively measuring a powder fill level in a filling apparatus for a rotary press where the fill apparatus comprises a filling pipe. The device comprises a first measuring electrode positioned on the filling pipe and a reference electrode. A first electrical capacitor is configured to be (Continued)

formed by the reference electrode and the first measuring electrode, wherein an electrical field is configured to be formed between the first measuring electrode and the reference electrode. The first measuring electrode is covered by an electrically conductive protective shielding on a side facing away from the filling pipe and the electrically conductive protective shielding is at a ground potential.

15 Claims, 3 Drawing Sheets

(51) Int. Cl.
*B30B 11/08* (2006.01)
*B30B 15/30* (2006.01)

(56) References Cited

U.S. PATENT DOCUMENTS

| | | | | |
|---|---|---|---|---|
| 6,490,920 | B1* | 12/2002 | Netzer | G01F 23/268 |
| | | | | 73/304 C |
| 2003/0000303 | A1* | 1/2003 | Livingston | G01F 23/266 |
| | | | | 73/304 C |
| 2012/0240675 | A1* | 9/2012 | Farmanyan | G01F 23/268 |
| | | | | 73/304 C |
| 2013/0297235 | A1* | 11/2013 | Oldfield | G01F 23/266 |
| | | | | 73/304 C |
| 2018/0029323 | A1* | 2/2018 | Heinrich | B30B 11/04 |

FOREIGN PATENT DOCUMENTS

| | | | |
|---|---|---|---|
| DE | 102017207162 A1 | * | 10/2018 |
| EP | 1961575 A2 | | 8/2008 |
| EP | 2400275 A1 | | 12/2011 |
| JP | 1986-204076 A | | 3/1988 |
| JP | 2009063500 A | | 3/2009 |
| JP | 2005127724 | | 5/2019 |
| KR | 101221619 B1 | * | 7/2013 |

OTHER PUBLICATIONS

English translation of KR-101221619-B1 by EPO. (Year: 2013).*
EP 20201517.8, filed Oct. 13, 2020, EP Search Report dated Apr. 9, 2021 (7 pages).
JP P2020-179776, Japanese Office Action mailed Dec. 28, 2021 (4 pages).
JP P2020-179776, English Translation of Japanese Office Action mailed Dec. 28, 2021 (3 pages).

* cited by examiner

DEVICE FOR CAPACITIVELY MEASURING THE POWDER FILL LEVEL IN A FILLING APPARATUS OF A ROTARY PRESS

CROSS REFERENCE TO RELATED INVENTION

This application is based upon and claims priority to, under relevant sections of 35 U.S.C. § 119, German Patent Application No. 10 2019 129 793.1, filed Nov. 5, 2019, the entire contents of which are hereby incorporated by reference.

TECHNICAL FIELD

The invention relates to a device for capacitively measuring the powder fill level in a filling apparatus for filling cavities in a die plate of a rotary press with a powder material to be pressed in the rotary press, comprising a filling pipe of the filling apparatus.

The invention also relates to a rotary press comprising a rotor that can be rotated by means of a rotary drive, wherein the rotor has an upper punch guide for upper punches of the rotary press, a lower punch guide for lower punches of the rotary press and a die plate arranged between the punch guides, wherein the punches interact with cavities of the die plate, furthermore comprising a filling apparatus by means of which the powder material to be pressed is added to the cavities of the die plate, wherein the filling apparatus comprises a filling pipe, furthermore comprising at least one upper pressing apparatus and at least one lower pressing apparatus that, during operation, interact with the upper punches and the lower punches such that they press the powder material in the cavities of the die plate, furthermore comprising an ejection apparatus in which pellets generated in the cavities are ejected.

BACKGROUND

In rotary presses, powder material added to cavities is pressed into pellets, in particular tablets, by means of upper and lower punches. The powder material is added to the cavities by means of a filling apparatus of the rotary press. Filling apparatuses of this kind frequently comprise a filling pipe, through which the powder material generally falls under the force of gravity into a filling chamber, from which said powder material arrives into the cavities, again generally under the force of gravity. In the process, it is desirable for the fill level in the filling apparatus, in particular in the filling pipe, to be monitored in order to ensure sufficient powder availability at all times. It has been proposed to arrange sensors inside the filling pipe for this purpose. However, the arrangement of a sensor in the flow of powder material results in disruption of the powder flow, for example in the formation of a bridge. This can undesirably interfere with powder availability.

EP 2 400 275 A1 describes a device for the non-invasive, contactless capacitive fill level measurement of for example, bulk materials in a container. The fill level sensor does not come into contact with the filling medium, the fill height of which is to be determined. Instead, electrodes are provided which are arranged in the manner of an open plate capacitor and between which a high-frequency alternating electrical field is generated, which penetrates the material to be measured without causing any damage. The capacitance of the capacitor thus formed depends on the permittivity of the filling material. The filling material to be measured has a different permittivity to air. In this way, when the material to be measured covers the sensor surface to different heights, this produces different capacitances for the capacitor. This can be used to determine the fill height of the material in the container.

However, external disruptive influences pose a problem, for example external electromagnetic fields or external objects, such as a hand of an operator in the vicinity of the measuring electrodes. In order to reduce the susceptibility of disruption from external influences, EP 2 400 275 A1 proposes arranging a plurality of measuring electrodes in different horizontal planes, which define a measuring surface with a vertical extent, and providing at least one reference electrode, which defines a reference surface with a vertical extent. Each of the plurality of measuring electrodes forms a capacitor with the reference electrode. At least two capacitors are measured and the measurement values are related to one another. Plausibility checks are intended to computationally eliminate external influences as sources of interference. However, the known device is associated with considerable constructional and evaluative effort. Furthermore, the plausibility assessment does not always produce a reliable result.

In order to protect the capacitive fill level measurement from external sources of interference, it is also known from practice to provide so-called active shielding, in which an electrode serving as a shield is energized to the same voltage potential as the measuring electrodes during the measurement. Although this active shielding can reduce the influence of external sources of interference, improved protection is still needed against interferences during capacitive fill level measurement.

On the basis of the explained prior art, the object of the invention is to provide a device and a rotary press of the above-cited type by means of which fill level measurement in a filling apparatus of a rotary press is possible without disruption of the powder flow and while minimizing external disruptive influences.

BRIEF SUMMARY OF THE INVENTION

An embodiment of a filling apparatus of a rotary press comprises a first measuring electrode is arranged on the filling pipe and forming a first electrical capacitor with a reference electrode such that an electrical field can be formed between the first measuring electrode and the reference electrode. In an embodiment, the first measuring electrode is covered on the side thereof facing away from the filling pipe by an electrically conductive protective shielding, wherein the protective shielding is at ground potential.

An embodiment of a filling apparatus of a rotary press configured to capacitively measuring the powder fill level in the filling apparatus.

In an embodiment, the rotary press may in particular be a rotary tablet press. Powder material to be pressed in the rotary press is supplied to the die plate by means of the filling pipe. The powder material may be conveyed through the filling apparatus and filling pipe under the force of gravity. The filling pipe may therefore be a downpipe. The filling pipe may be suitably arranged for this purpose. For example, the longitudinal axis of the filling pipe may be sufficiently inclined with respect to the horizontal, in particular it may extend vertically, for example. The filling apparatus may also comprise at least one filling chamber, into which the powder material arrives from the filling pipe. The powder material is fed from the filling chamber to the cavities of the die plate, in particular again under the force of gravity, where the powder material is pressed into pellets, in particular tablets, in a manner known per se by means of upper and lower punches. The cavities may be formed directly by holes of the die plate. However, removably fastened die sleeves in which the cavities are formed may also be arranged in the die plate.

In an embodiment, a first measuring electrode is arranged on the filling pipe and is configured to capacitively measure the powder fill level in the filling pipe. Said first measuring electrode interacts with a reference electrode of the device. Together, the electrodes form an electrical capacitor, similar to a plate capacitor. The first measuring electrode extends in the axial direction of the filling pipe over a defined measuring region. The reference electrode may also extend over said region. During operation, an electrical field that penetrates the interior of the filling pipe and thus the powder material to be measured without causing any damage is formed between the first measuring electrode and the reference electrode. As already explained, the capacitance of the capacitor depends on the permittivity of the medium penetrated by the electrical field. For example, air has a different permittivity to the powder material to be processed in the rotary press. As a result, based on a capacitance measurement of the capacitor, the degree to which the electrodes are covered by powder material can be determined. This can in turn be used to determine the fill level of the powder material in the filling pipe. Of course, a plurality of first measuring electrodes may also be provided. Equally, the reference electrode may comprise a plurality of (sub-)reference electrodes or be formed by a plurality of (sub-)reference electrodes.

According to the invention, the first measuring electrode is covered, in particular completely covered, on the side thereof facing away from the filling pipe by an electrically conductive and grounded protective shielding. The filling pipe may, for example, consist of a metal such as stainless steel. The protective shielding may also consist of metal, for example aluminum or stainless steel as well. According to the invention, it has been recognized that the active shielding method proposed in the prior art for the fill level measurement of powder material in a filling apparatus of a rotary press is not sufficient for obtaining reliable measurement results even with the application according to the invention despite possible external sources of interference. In the prior art, active shielding is proposed for a closed tank and for measuring a liquid. However, the present inventors have recognized that conveying a powder material through a filling apparatus, in particular a filling pipe, leads to other problems than when measuring the fill level of a liquid in a closed tank. For example, according to the inventors' findings, conveying the powder material through the filling apparatus leads to static charging of the powder material, which can influence the measurement results. Moreover, the powder material to be processed in a rotary press has a lower permittivity than the liquid to be measured in a tank in the prior art. These differences during application make a higher measuring accuracy necessary in the application according to the invention. This, in turn, means that external interferences, for example caused by external electromagnetic fields or people located in the vicinity of the measuring device, have to be eliminated all the more reliably.

This is achieved by means of the electrically conductive protective shielding according to the invention that is at ground potential. It reliably shields the first measuring electrode against external electromagnetic sources of interference. As a result, according to the invention, the fill level of the powder material to be processed in a rotary press can be reliably determined in the filling pipe. At the same time, expensive arrangements comprising a large number of measuring electrodes and complicated and unreliable plausibility assessments are avoided. The internal geometry of the filling pipe remains free of obstructions and the powder flow is not disrupted or influenced by the measuring sensors. External interferences, for example from electrical installations in the rotary press or physical contact by an operator, are not computationally eliminated from the measurement result as in the prior art, but rather are effectively suppressed at the outset.

According to one embodiment inspired by practice, the first measuring electrode can be arranged in an electrically non-conductive holding portion, wherein the holding portion is arranged on the filling pipe. In this way, even better shielding can be achieved. A non-conductive plastics material such as polyoxymethylene (POM), for example, may be used for this purpose. The holding portion as a whole may be covered on the outside by the protective shielding according to the invention. A jacket pocket for the first measuring electrode and, if applicable, additional measuring electrodes may be arranged in the holding portion.

According to another embodiment, the holding portion may be arranged in a recess in the filling pipe. In this case, the filling pipe comprises a cut-out in which the holding portion with the first measuring electrode is arranged. As a result, particularly good access is achieved for the measurement of the powder material in the filling pipe and therefore particularly accurate measurement is achieved, without the risk of disrupting the powder flow.

According to another embodiment, an electrically conductive filling pipe portion ECP1, ECP2 (FIG. 2) of the filling apparatus located before and/or after the filling pipe provided with the first measuring electrode may also be at ground potential. As already explained, the inventors have recognized that the powder material becomes statically charged when conveyed through the filling apparatus, in particular the filling pipe. According to the inventors' findings, this is caused by the friction between the powder material and the filling apparatus components guiding the powder material, in particular the filling pipe. By grounding an electrically conductive filling pipe portion ECP1 (FIG. 2) located upstream of the filling pipe provided with the first measuring electrode, this static charging is eliminated prior to the capacitive fill level measurement, and therefore it cannot distort the subsequent measurement. However, the powder material can once again undesirably become statically charged after the fill level measurement in the course of the further powder material conveying process. This can have a negative effect on the result of processing in the rotary press. In order to prevent this, it may be expedient to ground an electrically conductive filling pipe portion ECP2 (FIG. 2) located downstream of the filling pipe provided with the first measuring electrode. These filling pipe portions may, for example, also consist of a metal, such as stainless steel.

In an embodiment, the reference electrode and/or the filling pipe provided with the first measuring electrode may also be at ground potential. In this way, in addition to a particularly reliable measurement and an additional electromagnetic shielding, static charging of the powder material in the filling pipe provided with the first measuring electrode can be prevented or eliminated.

According to another embodiment, the reference electrode may also be arranged on the filling pipe provided with the first measuring electrode. The reference electrode may also be covered, in particular completely, on the side thereof facing away from the filling pipe by the electrically conductive protective shielding. The reference electrode may also be arranged in the electrically non-conductive holding portion.

According to another embodiment, the reference electrode may be formed by the filling pipe provided with the first measuring electrode. In this way, the first measuring electrode forms the electrical capacitor directly with the filling pipe as the reference electrode. Therefore, in contrast to the reference electrode being arranged on the filling pipe, an enlarged reference electrode can be used as the basis for the capacitance measurement. A particularly accurate and reliable capacitance measurement is possible in particular if the filling pipe and, if applicable, the protective shielding are at ground potential.

According to another embodiment, a second measuring electrode may also be arranged on the filling pipe, wherein the second measuring electrode and the reference electrode form a second electrical capacitor, such that an electrical field can be formed between the second measuring electrode and the reference electrode, and wherein the measuring region of the second measuring electrode is selected such that it is completely covered by powder material located in the filling pipe at all times during operation of the rotary press. The extent in the longitudinal direction or length of the filling pipe and thus the measuring region of the second measuring electrode is smaller than the extent of the first measuring electrode in the longitudinal direction of the filling pipe or length and thus its measuring region. For example, the extent of the second measuring electrode may be no more than 15%, preferably no more than 10%, of the first measuring electrode. The second measuring electrode may in particular be parallel to the first measuring electrode and end substantially flush with the lower end thereof or protrude beyond the lower end of the first measuring electrode. Providing a second measuring electrode of this kind that is completely covered by the powder material located in the filling pipe during operation of the rotary press makes it possible to measure the fill level with different powder materials or in the event of changes in the composition of the powder material. It can therefore be assumed, in the case that the powder material completely covers the second measuring electrode, that the electrical field formed between the second measuring electrode and the reference electrode is formed completely within the powder material. When the extent of the second measuring electrode in the axial direction of the filling pipe is known, the fill level of the powder material can be computationally determined from the capacitance measured for the first measuring electrode even in the case of different powder materials and without additional laborious calibration measures. Measurement is therefore possible regardless of the powder material or any changes in the composition of the powder material. It has been shown that the accuracy of the measurement can be further improved in this way.

According to another embodiment, a third measuring electrode may also be arranged on the filling pipe, wherein the third measuring electrode and the reference electrode form a third electrical capacitor, such that an electrical field can be formed between the third measuring electrode and the reference electrode, and wherein the measuring region of the third measuring electrode is selected such that it is located above the fill level of the powder material in the filling pipe at all times during operation of the rotary press. The extent in the longitudinal direction of the filling pipe and thus the measuring region of the third measuring electrode is again smaller than the extent of the first measuring electrode in the longitudinal direction of the filling pipe and thus its measuring region. For example, the extent of the third measuring electrode may again be no more than 15%, in particular no more than 10%, of the first measuring electrode. The third measuring electrode may in particular be parallel to the first measuring electrode and end substantially flush with the upper end of thereof or protrude beyond the upper end of the first measuring electrode. By means of a third measuring electrode of this kind, which is not covered, even partially, by powder material located in the filling pipe during operation of the rotary press, when the extent of the third measuring electrode in the axial direction of the filling pipe is known, a measurement is possible taking into account the properties of the filling apparatus, in particular the filling pipe. In particular, changes in the measurement environment that occur during operation can be detected without influencing the powder material and taken into account during fill level measurement by means of the first measuring electrode.

As already explained, in an embodiment, the reference electrode may comprise a plurality of (sub-) reference electrodes. However, it may also only comprise one reference electrode. Some or all of the measuring electrodes may form an electrical capacitor together with a reference electrode in the manner explained above. In particular, if the reference electrode comprises a plurality of (sub-)reference electrodes, some or all of the measuring electrodes may also form an electrical capacitor in the manner explained above with various of the (sub-)reference electrodes.

According to another embodiment, the second and/or third measuring electrode may also be covered, in particular completely covered, on the side thereof facing away from the filling pipe by the electrically conductive protective shielding. Furthermore, the second and/or the third measuring electrode may also be arranged in the electrically non-conductive holding portion. As already explained, the measurement result can be improved further in this way.

According to another embodiment, the protective shielding may form an active protective shielding that is energized to the same electrical potential as the first measuring electrode and/or the second measuring electrode and/or the third measuring electrode during a fill level measurement. Therefore, so-called active shielding may take place in order to further improve the shielding against external sources of interference and thus further improve the measurement result.

According to another embodiment, a control and evaluation apparatus may be provided, which controls the measuring and reference electrodes during operation of the rotary press and determines the fill level of the powder material in the filling pipe based on the measurement data of the measuring and reference electrodes. The control and evaluation apparatus may form part of a control and evaluation apparatus of the rotary press or it may be separate therefrom.

According to another embodiment, the measuring and/or reference electrodes may be arranged on substantially non-flexible polychlorinated biphenyls (PCBs). Classic PCBs of this kind typically have a thickness of more than 1 mm. This creates additional insulation, by means of which external disruptive influences can be minimized further.

BRIEF DESCRIPTION OF THE DRAWINGS

An exemplary embodiment of the invention is explained below in greater detail with reference to figures. Schematically.

The same reference numbers refer to the same objects in the figures unless indicated otherwise.

DETAILED DESCRIPTION OF THE INVENTION

Figure 1:
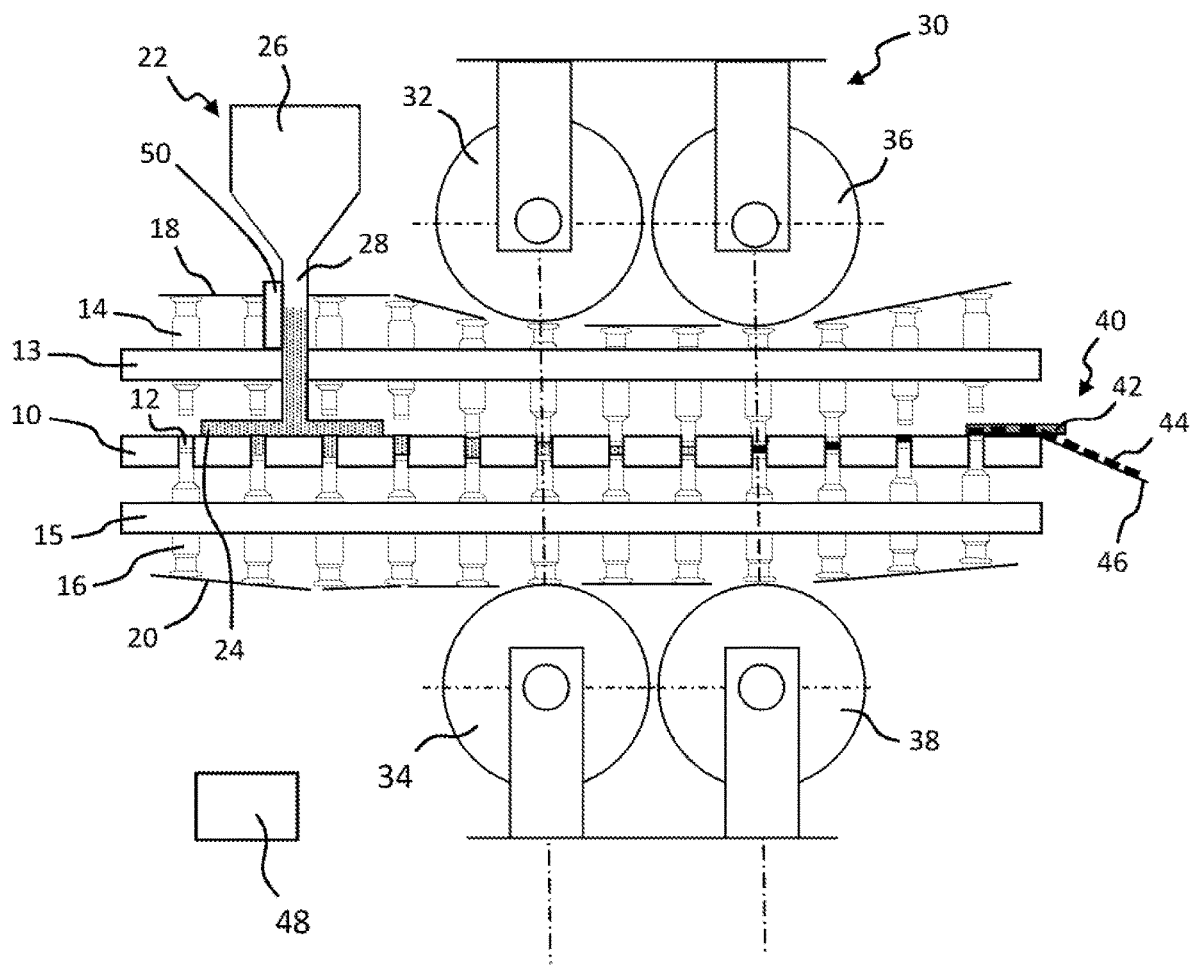
FIG. 1 illustrates a sectional view of an embodiment of a rotary press including a flattened representation of the rotor.
Figure 2:
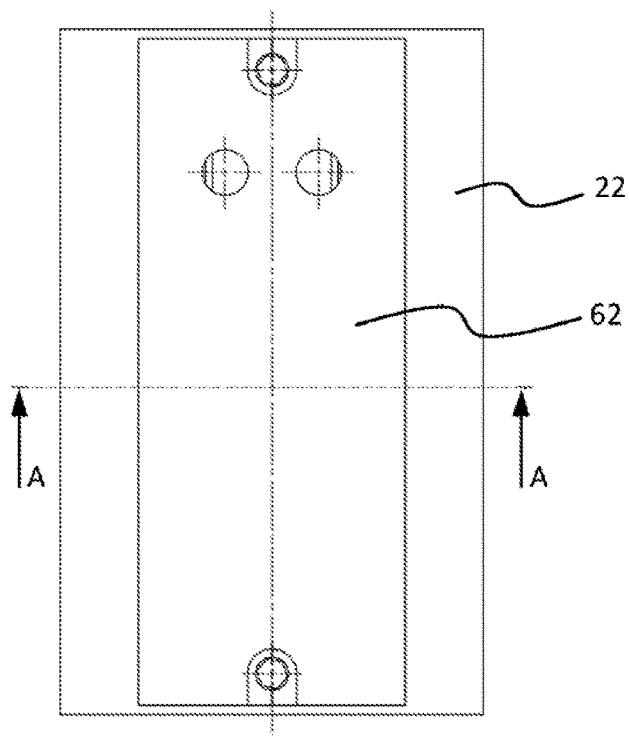
FIG. 2 illustrates a side view of an embodiment a device for capacitively measuring the powder fill level in the filling apparatus of a rotary press in a side view.
Figure 3:
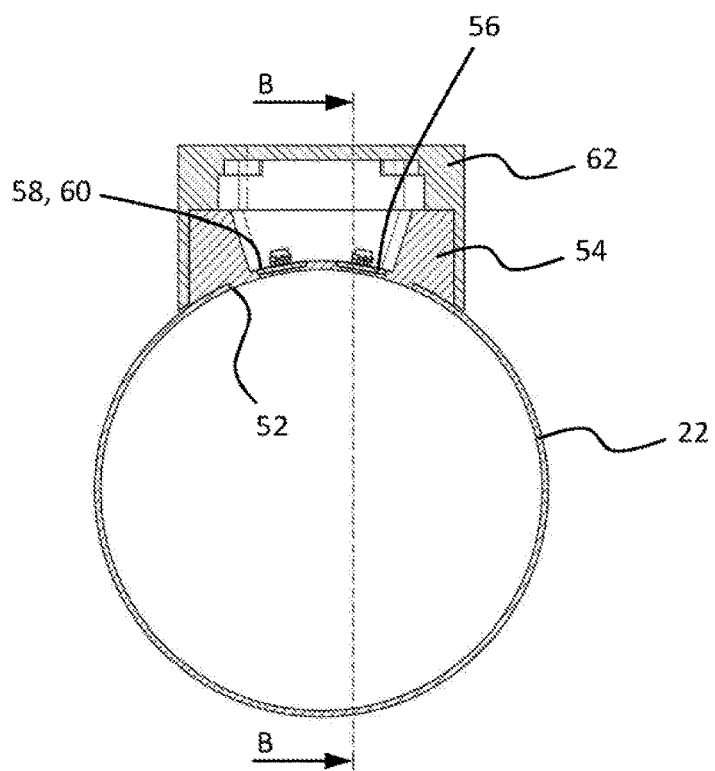
FIG. 3 illustrates a sectional view along the line A-A of the embodiment of FIG. 2.
Figure 4:
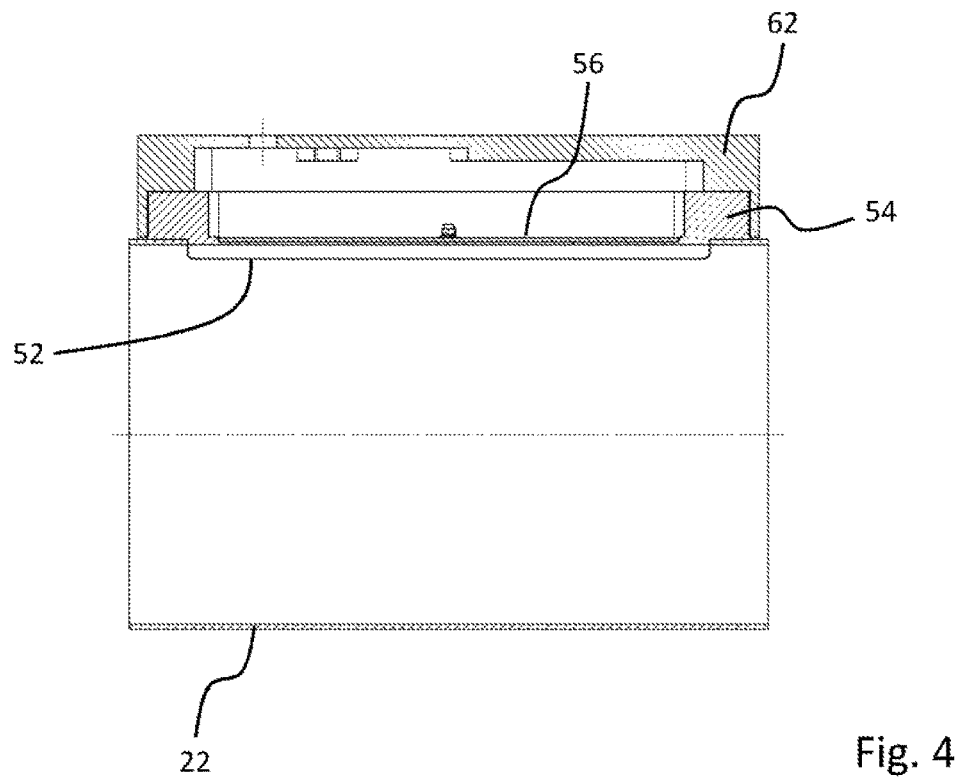
FIG. 4 illustrates a sectional view along the line B-B of the embodiment of FIG. 3.
Figure 5:
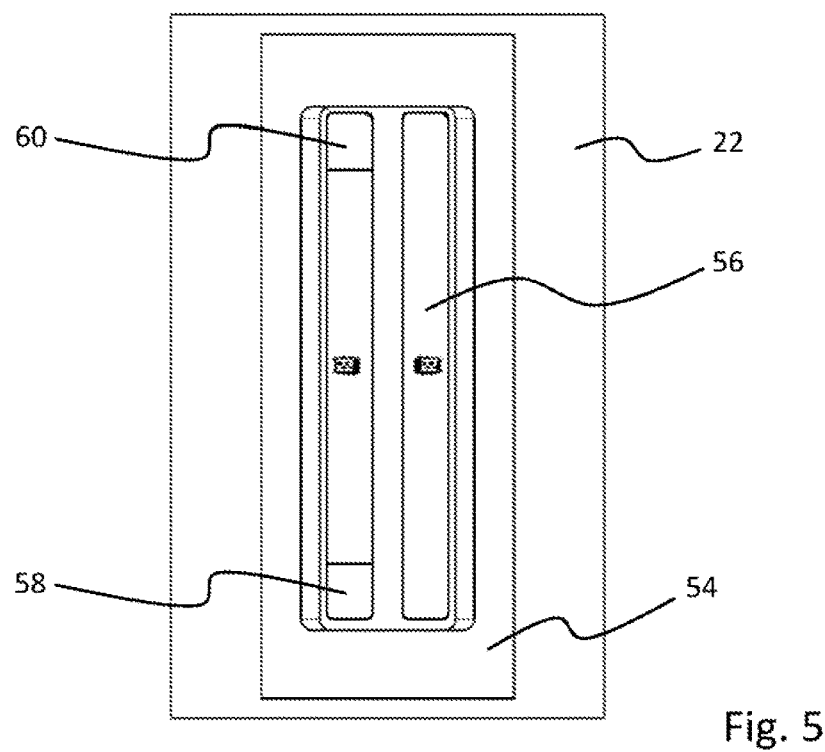
FIG. 5 illustrates the embodiment of FIG. 2 with the protective shielding removed.

The rotary tablet press shown in FIG. 1 comprises a rotor that is rotationally driven by a rotary drive (not shown) with a die plate 10 which has a plurality of cavities 12. The cavities 12 can for example be formed by holes in the die plate 10. The rotor also comprises a plurality of upper punches 14 guided in an upper punch guide 13 and a plurality of lower punches 16 guided in a lower punch guide 15, which rotate synchronously with the die plate 10. In each case, a pair consisting of an upper punch 14 and a lower punch 16 is assigned to a cavity 12. The axial movement of the upper punches 14 and lower punches 16 during the rotation of the rotor is controlled by upper control cam elements 18 and lower control cam elements 20. The rotary tablet press moreover comprises a filling apparatus 22 which has a filling chamber 24. The filling apparatus 22 moreover comprises a funnel-shaped filling material reservoir 26 which is connected by a filling pipe 28 to the filling chamber 24. In this manner, the powdered filling material in the present example passes under the force of gravity via the filling pipe 28 into the filling chamber 24, and passes therefrom via a filling opening provided in the bottom side of the filling chamber 24 into the cavities 12 of the die plate 10, again under the force of gravity.

Moreover, the rotary tablet press comprises a pressing apparatus 30. The pressing apparatus 30 comprises a pre-pressing apparatus with an upper pre-pressing roller 32 and a lower pre-pressing roller 34, as well as a main pressing apparatus with an upper main pressing roller 36 and a lower main pressing roller 38. Furthermore, the rotary tablet press comprises an ejection apparatus 40, in the present case with a scraper 42 which supplies the tablets 44 produced in the rotary tablet press to a tablet discharge 46. An evaluation and control apparatus 48 controls operation of the rotary press and is connected, inter alia, to the rotary drive of the rotor by lines (not shown).

A device 50 for capacitively measuring the powder fill level in the filling pipe 28 is also arranged on the filling pipe 28. The device 50 is also connected to the evaluation and control apparatus 48. In FIGS. 2-5, the device 50 for capacitively measuring the powder fill level is shown in various views. As can in particular be seen in FIGS. 3 and 4, the filling pipe 28 comprises a recess 52 in which a holding portion 54 made of an electrically non-conductive material, for example a plastics material such as POM, is arranged. The holding portion 54 bears a first measuring electrode 56, which extends in the axial direction of the filling pipe 28, as well as second and third measuring electrodes 58, 60, which are arranged in parallel with the first measuring electrode 56 and each extend in parallel with and over approximately 10% of the length of the first measuring electrode 56. The second measuring electrode 58 is arranged in the region of the lower end of the first measuring electrode 56 and the third measuring electrode 60 is arranged in the region of the upper end of the first measuring electrode 56, as can be seen in particular in FIG. 5. The holding portion 54 and with it the measuring electrodes 56, 58 and 60 are moreover covered on the side thereof facing away from the filling pipe 28 by an electrically non-conductive protective shielding 62, which is at ground potential. The protective shielding 62 is not shown in FIG. 5 for illustrative reasons. The filling pipe 28 is also at ground potential in the example shown. The filling pipe 28 and the protective shielding 62 may, for example, consist of a metal. For example, the filling pipe 28 may consist of a stainless steel and the protective shielding 62 of aluminium.

The filling pipe 28 forms a reference electrode for the measuring electrodes 56, 58 and 60 in the exemplary embodiment shown in the figures. The measuring electrodes 56, 58 and 60 therefore form three electrical capacitors with the filling pipe 28 as the reference electrode, such that an electrical field can be formed between each of the measuring electrodes 56, 48 and 60 and the reference electrode 28. The second measuring electrode 58 may be covered completely by powder material located in the filling pipe 28 at all times during operation of the rotary press, while the third measuring electrode 60 may be located above the fill level of the powder material in the filling pipe 28. The first measuring electrode 56 forms, with its longitudinal extension, a measuring region for measuring the powder fill level in the filling pipe 28. During operation, controlled by the evaluation and control apparatus 48, an electrical field is formed between each of the measuring electrodes 56, 58 and 60 and the filling pipe 28, which serves as the reference electrode, and the capacitance of the respectively formed capacitors is measured, again by the evaluation and control apparatus 48. The evaluation and control apparatus 48 determines the powder fill level in the filling pipe 28 from the capacitance measurement. External sources of interference can be largely minimized by means of the protective shielding 62 at ground potential. By using the filling pipe 28 as the reference electrode, which is also at ground potential, a particularly accurate and reliable capacitance measurement is possible. By means of the second and third measuring electrode 58, 60, influences on the measurement result caused by changes to the powder material or properties of the filling pipe 28 can be eliminated.

LIST OF REFERENCE NUMBERS

10 Die plate
12 Cavities
13 Upper punch guide
14 Upper punches
15 Lower punch guide
16 Lower punches
18 Upper control cam elements
20 Lower control cam elements
22 Filling apparatus
24 Filling chamber
26 Filling material reservoir
28 Filling pipe
30 Pressing apparatus 32 Upper pre-pressing roller
34 Lower pre-pressing roller
36 Upper main pressing roller
38 Lower main pressing roller
40 Ejection apparatus
42 Scraper
44 Tablets
46 Tablet discharge
48 Evaluation and control apparatus
50 Device
52 Recess
54 Holding portion
56 First measuring electrode
58 Second measuring electrode
60 Third measuring electrode
62 Protective shielding

The invention claimed is:

1. A device for capacitively measuring a fill level of a powder material in a filling apparatus for a rotary press, wherein the fill apparatus comprises a filling pipe extending along a longitudinal axis, the device comprising:
    an electrically non-conductive holding portion positioned on the filling pipe;
    a first measuring electrode supported by the electrically non-conductive holding portion and extending along the longitudinal axis;
    a reference electrode extending along the longitudinal axis and configured to form a first electrical capacitor with the first measuring electrode, wherein an electrical field is configured to be formed between the first measuring electrode and the reference electrode; and
    a second measuring electrode positioned on the filling pipe and extending along the longitudinal axis,
    wherein the first measuring electrode is covered by an electrically conductive protective shielding on a side facing away from the filling pipe,
    wherein the electrically conductive protective shielding is maintained at a ground potential,
    wherein the second measuring electrode extends over no more than 15% of a length of the first measuring electrode and is positioned in a region of a lower end of the first measuring electrode,
    wherein the second measuring electrode and the reference electrode form a second electrical capacitor,
    wherein an electrical field is configured to be formed between the second measuring electrode and the reference electrode, and
    wherein a measuring region of the second measuring electrode is covered by the powder material located in the filling pipe during operation of the rotary press.

2. The device according to claim 1, wherein the electrically non-conductive holding portion is positioned in a recess defined on the filling pipe.

3. The device according to claim 1, wherein the filling apparatus comprises an electrically conductive filling pipe portion that is at the ground potential, wherein the electrically conductive filling pipe portion is positioned at one of: (i) upstream of the filling pipe; and (ii) downstream of the filling pipe.

4. The device according to claim 1, wherein the reference electrode is at the ground potential.

5. The device according to claim 1, wherein the first measuring electrode is at the ground potential.

6. The device according to claim 1, wherein the reference electrode is positioned on the filling pipe.

7. The device according to claim 1, wherein the reference electrode is formed by the filling pipe.

8. The device according to claim 1, further comprising:
    a third measuring electrode located on the filling pipe and extending along the longitudinal axis,
    wherein the third measuring electrode and the reference electrode form a third electrical capacitor,
        wherein the third measuring electrode extends over no more than 15% of the length of the first measuring electrode and is positioned in a region of an upper end of the first measuring electrode,
        wherein an electrical field is configured to be formed between the third measuring electrode and the reference electrode, and
        wherein a measuring region of the third measuring electrode is located above the fill level of the powder material in the filling pipe at all times during operation of the rotary press.

9. The device according to claim 1, wherein the second measuring electrode is covered by the electrically conductive protective shielding on a side facing away from the filling pipe.

10. The device according to claim 9, wherein the second measuring electrode is supported by the electrically non-conductive holding portion.

11. The device according to claim 1, further comprising a control and evaluation apparatus configured to control the first measuring electrode and the reference electrode during operation of the rotary press and further configured to determine the fill level of the powder material in the filling pipe based on measurement data of the first measuring electrode and the reference electrode.

12. The device according to claim 1,
    wherein the second measuring electrode extends over no more than 10% of the length of the first measuring electrode and is positioned in the region of the lower end of the first measuring electrode.

13. The device according to claim 1, further comprising:
    a third measuring electrode located on the filling pipe and extending along the longitudinal axis,
    wherein the third measuring electrode and the reference electrode form a third electrical capacitor,
        wherein the third measuring electrode extends over no more than 10% of the length of the first measuring electrode and is positioned in a region of an upper end of the first measuring electrode,
        wherein an electrical field is configured to be formed between the third measuring electrode and the reference electrode, and
    wherein a measuring region of the third measuring electrode is located above the fill level of the powder material in the filling pipe at all times during operation of the rotary press.

14. A rotary press comprising:
    a rotor configured to be rotated by a rotary drive, wherein the rotor comprises,
        an upper punch guide,
        a lower punch guide, and
        a die plate defining a plurality of cavities and positioned between the upper punch guide and the lower punch guide;
    a plurality of upper punches configured to be guided by the upper punch guide;
    a plurality of lower punches configured to be guided by the lower punches, wherein
the plurality of upper and lower punches interact with the plurality of cavities of the die plate;
    at least one upper pressing apparatus and at least one lower pressing apparatus;

a filling apparatus configured to dispense a powder material to be pressed into the plurality of cavities of the die plate, wherein the filling apparatus comprises a filling pipe extending along a longitudinal axis, and wherein the at least one upper pressing apparatus and the at least one lower pressing apparatus are configured to interact with the plurality of upper punches and the plurality of lower punches to press the powder material in the cavities of the die plate;

an ejection apparatus configured to eject pellets generated in the cavities;

a device for capacitively measuring a fill level of the powder material in the filling apparatus, the device comprising, an electrically non-conductive holding portion positioned on the filling pipe, a first measuring electrode supported by the electrically non-conductive holding portion and extending along the longitudinal axis, the first measuring electrode configured to form a first electrical capacitor with a reference electrode that extends along the longitudinal axis, wherein an electrical field is configured to be formed between the first measuring electrode and the reference electrode, wherein the first measuring electrode is covered by an electrically conductive protective shielding on a side facing away from the filling pipe, and wherein the electrically conductive protective shielding is maintained at a ground potential, and a second measuring electrode positioned on the filling pipe and extending along the longitudinal axis, wherein the second measuring electrode extends over no more than 15% of a length of the first measuring electrode and is positioned in a region of a lower end of the first measuring electrode, wherein the second measuring electrode and the reference electrode form a second electrical capacitor, wherein an electrical field is configured to be formed between the second measuring electrode and the reference electrode, and wherein a measuring region of the second measuring electrode is covered by the powder material located in the filling pipe during operation of the rotary press.

15. The rotary press according to claim 14, further comprising:

a third measuring electrode located on the filling pipe and extending along the longitudinal axis, wherein the third measuring electrode and the reference electrode form a third electrical capacitor, wherein the third measuring electrode extends over no more than 15% of the length of the first measuring electrode and is positioned in a region of an upper end of the first measuring electrode, wherein an electrical field is configured to be formed between the third measuring electrode and the reference electrode, and wherein a measuring region of the third measuring electrode is located above the fill level of the powder material in the filling pipe at all times during operation of the rotary press.

* * * * *